(12) United States Patent
Vornweg

(10) Patent No.: US 11,471,986 B2
(45) Date of Patent: Oct. 18, 2022

(54) MULTIPLEX BOLTING TOOL

(71) Applicant: Heico Befestigungstechnik GmbH, Ense-Niederense (DE)

(72) Inventor: Stefan Vornweg, Ense-Niederense (DE)

(73) Assignee: HEICO BEFESTIGUNGSTECHNIK GMBH, Ense-Niederense (DE)

( * ) Notice: Subject to any disclaimer, the term of this patent is extended or adjusted under 35 U.S.C. 154(b) by 272 days.

(21) Appl. No.: 16/970,058

(22) PCT Filed: Feb. 23, 2018

(86) PCT No.: PCT/EP2018/054517
§ 371 (c)(1),
(2) Date: Aug. 14, 2020

(87) PCT Pub. No.: WO2019/161913
PCT Pub. Date: Aug. 29, 2019

(65) Prior Publication Data
US 2021/0114151 A1    Apr. 22, 2021

(51) Int. Cl.
  *E21B 19/16* (2006.01)
  *B23P 19/06* (2006.01)
  *E21B 17/08* (2006.01)

(52) U.S. Cl.
  CPC ........... *B23P 19/069* (2013.01); *B23P 19/065* (2013.01); *B23P 19/061* (2013.01); *E21B 17/085* (2013.01); *E21B 19/16* (2013.01)

(58) Field of Classification Search
  CPC ...... B23P 19/069; B23P 19/065; B23P 19/061
  (Continued)

(56) References Cited

U.S. PATENT DOCUMENTS 7,146,880 B1 * 12/2006 Francis ............... B25B 23/0078
  81/57.44
8,464,644 B2 * 6/2013 Fujimoto ............. B23Q 1/0027
  108/20

(Continued)

FOREIGN PATENT DOCUMENTS

DE    10236585 A1    2/2004
EP     2233249 A1    9/2010
(Continued)

OTHER PUBLICATIONS

International Search Report dated Aug. 29, 2019 in parent International application PCT/EP2018/054517.

(Continued)

*Primary Examiner* — Matthew R Buck
*Assistant Examiner* — Douglas S Wood
(74) *Attorney, Agent, or Firm* — Polson Intellectual Property Law, PC; Margaret Polson; Christopher Sylvain

(57) ABSTRACT

A torque wrench for multiple bolts or nuts comprises multiple drive spindles arranged annularly around a center and equipped or able to be equipped at the end with respective torque-applying tools, and a ratchet drive, associated with each drive spindle and driven by a hydraulic piston drive, for driving the drive spindles. The drive spindles are rotatably mounted and held in a drive block and have a drive portion at each end, which protrudes from the drive block. The drive sections of the drive spindles serve to bear the torque-applying tools on one side of the drive block, in which drive block the pistons of the piston drives are routed in cylinder housings, such that said pistons are translationally displaceable in both directions. The piston rods are kinematically connected to the ratchet lever for transferring a forward stroke movement and a return stroke movement to respective ratchet levers with pawls. The drive block has at least one fluid distribution cavity in its center area, into which (Continued)

open multiple fluid ducts located in the drive block, wherein a fluid connection between the fluid distribution cavity and a first fluid input of a cylinder housing is established by each fluid duct. A fluid distributor with an annular duct connected to a fluid supply duct is arranged on a flat side of the drive block as a fluid distribution cavity, into which multiple fluid ducts open, wherein a fluid connection between the fluid distribution cavity and a second fluid input of a cylinder housing is established by each fluid duct.

25 Claims, 4 Drawing Sheets

(58) Field of Classification Search
USPC .......................................................... 81/57.22
See application file for complete search history.

(56) References Cited

U.S. PATENT DOCUMENTS

| | | | |
|---|---|---|---|
| 9,657,593 B2* | 5/2017 | Todorovic | F02C 3/13 |
| 10,525,562 B2* | 1/2020 | Tachiki | B23Q 16/105 |
| 2007/0074606 A1* | 4/2007 | Haise | E21B 19/164 |
| | | | 81/57.16 |
| 2010/0025046 A1* | 2/2010 | Francis | E21B 19/163 |
| | | | 166/380 |
| 2010/0199812 A1* | 8/2010 | Richardson | E21B 19/164 |
| | | | 81/57.24 |
| 2014/0245869 A1* | 9/2014 | Rice | B23P 19/069 |
| | | | 81/473 |
| 2016/0312550 A1* | 10/2016 | Jonassen | E21B 19/16 |

FOREIGN PATENT DOCUMENTS

| | | |
|---|---|---|
| FR | 3012189 A1 | 4/2015 |
| WO | 2009135201 A2 | 11/2009 |
| WO | 2010124150 A2 | 10/2010 |

OTHER PUBLICATIONS

Written Opinion of the International Searching Authority dated Aug. 29, 2019 in parent International application PCT/EP2018/054517.
Pending U.S. Appl. No. 16/963,120, filed Jul. 17, 2020, applicant Heico Befestigungstechnik GmbH.
Pending U.S. Appl. No. 16/968,405, filed Aug. 7, 2020, applicant Heico Befestigungstechnik GmbH.

* cited by examiner

MULTIPLEX BOLTING TOOL

BACKGROUND

The present disclosure relates to a multiplex bolting tool, also called a torque wrench for multiple bolts or nuts with multiple drive spindles that are arranged around a center and are equipped or able to be equipped at the end with respective torque-applying tools, and a ratchet drive, associated with each drive spindle and driven by means of a hydraulic piston drive, for driving the drive spindles.

Torque wrenches for multiple bolts or nuts serve the purpose of applying torque to a plurality of screw connections in a single screwing process and thus, for example, tightening or loosening bolts, which are arranged in a ring arrangement. Simultaneously applying torque to a plurality of screw connections shortens the time otherwise required for applying torque to several screw connections. Furthermore, when applying torque to individual screw connections, which are arranged annularly around a center, care must be taken to ensure that the components to be bolted together do not tilt relative to each other, which is why the screw connections must be tightened according to a predefined screwing pattern. If this is not adhered to, there is a risk that a joint consisting of several screw connections will not be fastened properly.

Torque wrenches for multiple bolts or nuts are used for connecting risers in oil or water wells, for example. At their ends, these pipes have connecting flanges protruding outward in the radial direction. To connect two such pipes, the adjacent connecting flanges are bolted together with several screw connections. A torque wrench for multiple bolts or nuts suitable for this purpose is known from EP 2 288 476 B1. With this previously known torque wrench for multiple bolts or nuts, a number of torque-applying devices corresponding to the number of screws to be tightened or loosened is provided, for example six torque stations. The torque stations are arranged around a center. This previously known torque-applying device is designed in an annular shape and leaves a central opening through which the pipes with their flanges can be pulled. Each torque station is displaceable in the radial direction, such that it can be adjusted from a non-operating position, in which a riser with its flange can be passed through a central opening of the torque wrench for multiple bolts or nuts, into an operating position for applying torque to the screw bolts. In order to apply torque to the screw connections of two adjacent connecting flanges of second risers, the torque stations are displaced in the radial direction to their operating position. Each torque station has a drive spindle, which drives a socket as a torque-applying tool. The socket has an inner contour, which is complementary to the outer contour of the head of a screw bolt that is meant to be tightened or loosened by means of the torque station.

Each drive spindle is driven by its own hydraulically actuated ratchet drive. For this purpose, the piston rod of a hydraulically actuated piston is connected to the ratchet lever of the ratchet drive. The ratchet lever has a pawl, which drives a drive spindle that is rotatably supported in the ratchet lever. The drive spindle has a square opening, into which the square drive, which has a complementary geometry to one end of a socket as a torque-applying tool, can be inserted. The pawl is under spring preload and interacts with the outer splines of the drive spindle under the spring preload. With a forward stroke of the piston rod, the drive spindle is advanced by at least one tooth, proportional to the executed stroke, relative to the pawl. With the return stroke, the ratchet lever is returned to its initial position, while the bolt does not turn back. This alternation between the forward and return stroke is carried out until the bolt is tightened with the intended torque.

The necessary radial adjustability of the torque stations in this prior art means that this torque wrench for multiple bolts or nuts is relatively large in the radial direction. This is unproblematic for the application cases described in this prior art, since there is no lack of space on a drilling platform in this respect. Each torque station is connected to a hydraulic unit via two hydraulic lines extending outside of the torque-applying device.

Also known are torque wrenches for multiple bolts or nuts, the drive spindles of which are equipped with a torque-applying tool and are driven by an electric motor. Therein, each drive spindle is driven by its own electric motor. If screw connections are to be tightened with a correspondingly higher torque, it is necessary with such a torque wrench for multiple bolts or nuts to allocate a correspondingly powerful electric motor along with gearing and its own control to each torque station. Correspondingly, such a torque wrench for multiple bolts or nuts is complex in its design and thus also in its manufacturing. The weight of such a previously known torque wrench for multiple bolts or nuts, by means of which the screw connections can be tightened with even higher torques, is so high that it can only be handled with a crane. This limits the range of applications.

SUMMARY

Proceeding from this background, an aspect of the present disclosure is to refine a torque wrench for multiple bolts or nuts having multiple drive spindles of the type mentioned above, which are arranged around a center, in such a manner that the torque wrench for multiple bolts or nuts can be designed compactly and that the torque wrench for multiple bolts or nuts therefore is also suitable for a mobile use.

According to the present disclosure, this aspect is provided by a generic torque wrench for multiple bolts or nuts of the type mentioned at the onset, in which the drive spindles are rotatably supported and held inside a drive block, and the drive spindles have a drive section protruding from the drive block on each end, wherein the drive sections of the drive spindles serve to bear the torque-applying tools on one side of the drive block, in which drive block the pistons of the piston drives are routed in cylinder housings, such that said pistons are translationally displaceable in both directions, wherein the piston rods are kinematically connected to the ratchet lever for transferring a forward stroke movement and a return stroke movement to respective ratchet levers with pawls, and which drive block has at least one fluid distribution cavity in its center area, into which open several fluid ducts located in the drive block, wherein a fluid connection between the fluid distribution cavity and a first fluid input of a cylinder housing is established by means of each fluid duct, and in which a fluid distributor with an annular duct connected to a fluid supply duct is arranged on a flat side of the drive block as a fluid distribution cavity, into which fluid distribution cavity multiple fluid ducts open, wherein a fluid connection between the fluid distribution cavity and a second fluid input of a cylinder housing is established by means of each fluid duct.

In this torque wrench for multiple bolts or nuts, the drive spindles of which are driven by a hydraulically actuated ratchet drive, the drive spindles as well as the cylinder housings of the hydraulic piston drives are located in a drive block. The drive spindles are supported rotatably in this drive block and are held to prevent them from falling out. It should be noted here that the drive spindle bores of the drive block are continuous and that the drive spindles penetrate the entire drive block. The two sections protruding from, or extending beyond, the drive block in turn represent drive sections and therefore have a rotary cam contour, which can, for example, be executed as a polygonal section, typically as hexagonal section. The drive sections of the drive spindles, which protrude from one side of the drive block, serve for supporting the respective torque-applying tools. These can be detachably attached to the respective drive spindles in a torque-transmitting manner. Also entirely possible is an embodiment, in which the torque-applying tools are non-detachably connected to the drive spindle or are formed onto the same. As the drive spindles protrude on both sides of the drive block with respective drive sections, it is not necessary to provide a mechanical device to switch the rotational direction between an operation for tightening a screw connection and one for loosening a screw connection. For this purpose, it is only necessary to release the torque-applying tools seated on the one drive section, for example for tightening the screw connections, from the drive spindles, and to connect them to the respective other drive section. Depending on the desired use of such a torque wrench for multiple bolts or nuts, a design is also possible, in which torque-applying tools are seated on the two opposite drive sections of the drive spindles. The torque wrench for multiple bolts or nuts then does not need to be converted from a tightening operation to a loosening operation, but only needs to be turned. As this torque wrench for multiple bolts or nuts does not require a switching mechanism, the ratchet drive can be realized with correspondingly few components.

The hydraulically actuated piston-cylinder arrangements for driving the ratchet drives are also integrated in the drive block. Typically, corresponding recesses are provided or introduced in the drive block for this purpose, into which recesses a screw-in cylinder with the actuating piston supported therein is screwed. The piston supported in the cylinder is hydraulically adjustable in both directions, such that a forward stroke movement and a return stroke movement can be executed. Additional returning elements, such as springs, spring packages or the like for returning the piston with its piston rod after executing a stroke in its initial position can be dispensed with, whereby in turn the design of the ratchet drives is simplified. Such a ratchet drive comprises a ratchet lever with a pawl. The pawl bears teeth on its one side, which interact with teeth on the lateral surface of the drive spindle that are complementary with respect to their geometry. The ratchet lever can be pivoted about the axis of the drive spindle across a certain angular range, namely to the extent that the drive spindle is advanced by at least one tooth of the ratchet drive. This does not require a particularly large installation space. To drive the ratchet lever, the forward stroke movement and the return stroke movement of the piston rod is transferred to the ratchet lever by connecting the piston rod directly or by intermediate transfer means, such as articulated links.

Arranging the drive spindles around a center of the drive block allows for a fluid supply of the actuating cylinders with respect to applying fluid for executing the stroke direction originating from the center. The supply of the hydraulic fluid to the actuator cylinders then extends outward in a radial direction from a central fluid supply. For this purpose, a central fluid distribution cavity, for example in the form of an annular duct, is introduced into the drive block. In the case of an annular duct, it can be provided by means of a bore introduced into the drive block, in the wall of which the annular duct is incorporated with respect to its geometry. A body is then inserted into the bore, which body otherwise fills the bore and which typically is executed as a cylindrical cone, such that only the annular duct is available as fluid path for hydraulic fluid. A fluid supply duct opens into this annular duct, through which fluid supply duct hydraulic fluid is fed into the drive block from the outside. Multiple fluid ducts open into the fluid distribution cavity, by means of which fluid ducts this fluid distribution cavity is connected to the first fluid inputs of the respective control cylinders. These fluid ducts extend through the drive block in a radial direction. Hydraulic fluid is fed to the actuator cylinders in the axial direction via a second fluid distributor. An annular duct is in turn provided by means of this fluid distributor, into which annular duct fluid ducts open, by means of which a fluid connection is established between this fluid distribution cavity and the respective second fluid inputs of the actuator cylinders. The fluid ducts for feeding hydraulic fluid from the two fluid distribution cavities typically extend at least mostly in the drive block and are executed in them as bores.

This fluid supply of the actuator cylinders located in the drive block also allows for an embodiment of the drive block of the torque wrench for multiple bolts or nuts, in which actuator cylinders are arranged in multiple, for example, two planes on top of each other. Such a drive block is preferably composed of multiple block discs, wherein each block disc represents a plane of the actuator cylinders. Therein, the individual block discs can be identical in principle and be equipped with actuator cylinders, wherein two respective block discs are arranged and held at an angular offset to each other. The axial fluid ducts can easily extend in different planes of a drive block designed in such a manner. The central fluid supply is also executed in the same way as the manner already described, wherein a fluid distribution cavity, typically an annular chamber, is located in each plane. In such an embodiment, the annular chambers of the two planes are in fluidic connection with each other, typically by means of an axial bore introduced into a fluid distributor as a plug. Transverse bores to this central axial bore then establish the fluidic connection from the central bore to the fluid distribution cavities executed as annular chambers.

The previously described design of the drive block of the torque wrench for multiple bolts or nuts allows for a particularly compact design of the same. The strokes which the piston rods are required to perform only need to be long enough to advance the drive spindle by one tooth. Thus, only a correspondingly small space to move needs to be provided for the freedom of movement of the ratchet lever. In addition, the piston only needs to be moved across a relatively small movement path for executing such a stroke. This has a positive effect toward a compact design of the torque wrench for multiple bolts or nuts. This is also advantageous with respect to the hydraulic operation, as only a relatively small amount of hydraulic fluid has to be moved to execute a stroke of each actuator cylinder, which in turn has an advantageous effect on the dimensioning of the hydraulic pump and the time required for conveying the hydraulic fluid and thus for applying torque to the screw connection.

The ratchet levers can be connected directly to the piston rod. In such a case, in order to avoid the implementation of a joint in the piston rod, it is proposed that the piston rod has a push rod at its drive end, which push rod has a smaller diameter than the diameter of the piston rod and which penetrates a drive bolt of the ratchet lever. Using the tappet located between the push rod and the rest of the piston rod, the piston rod then acts against the drive bolt for transmitting a forward stroke movement. When the push rod engages with the drive bolt, it is provided that the relevant opening in the drive bolt of the ratchet lever is large enough in the radial direction that the push rod engaging with the same engages with play, thus not jamming when exercising a stroke, in which the ratchet lever performs a circular segment movement in the position of its drive bolt. According to one example embodiment, a snap ring mounted on the end of the previously described push rod serves for transferring the return stroke movement to the ratchet lever, which snap ring then serves as a tappet for the drive bolt of the ratchet lever on the side facing away from the piston rod.

According to another embodiment for transferring a piston movement to the ratchet lever, this movement is not transferred directly to the ratchet lever, as described in the example embodiment above, but by means of an intermediate connection of a link or a chain link, such as a toggle lever. While the longitudinal axis of the hydraulic actuator cylinder extends transversely to the rotational axis of the drive spindles in the embodiment in which the piston rod is directly connected to the ratchet lever, the hydraulic actuator cylinders can be arranged with their longitudinal axis parallel to the rotational axis of the drive spindles in the drive block when they are connected via a link. Thus, it is possible in this concept to arrange the hydraulic actuator cylinders in one way or another depending on the desired size of the drive block.

In a further development of such a torque wrench for multiple bolts or nuts, it is provided that, in addition to the ratchet drive, a locking ratchet for locking the drive spindle acts on each drive spindle to keep it from turning back when performing a return stroke movement of the drive ratchet, which locking ratchets are arranged in an annular locking bracket penetrated by the drive spindles, and that the locking bracket has means for loosening the locking ratchets.

In this torque wrench for multiple bolts or nuts, a locking ratchet acts on each drive spindle, in addition to the ratchet drive. The ratchet of the ratchet drive, as well as the locking ratchet, respectively act on the drive spindle in the same direction. Both the pawl of the ratchet drive and the locking pawl of the locking ratchet are in engagement with outer splines of the drive spindle. The pawl of the ratchet drive and the locking pawl of the locking ratchet engage with the teeth of the drive spindle in equal measure. This means that, when performing a return stroke of the ratchet lever of the ratchet drive, the locking ratchet prevents the drive spindle from springing back, for example due to a previously induced torsional force of the drive spindle. The locking ratchets of this torque wrench for multiple bolts or nuts are arranged in a locking bracket, which is penetrated by the drive spindles. The locking bracket thus follows the arrangement of the drive spindles arranged around a center. Typically, the locking bracket is annular. However, an embodiment in which it only extends across a circular segment also is possible. Even in such an embodiment, the drive spindles are arranged around a center, however, not in a ring structure but only in a circular segment structure. Providing a locking bracket in which the locking ratchets are arranged makes it possible that said locking bracket has means for loosening the locking ratchets. With these means, the locking pawls can be moved out of their position engaging with outer splines of the drive spindle. For this purpose, the locking pawls are typically held in the locking bracket translationally against the force of a return spring, against which spring force the locking pawls are moved out of their locking position, in which their hooks engage with outer splines of the drive spindle. The guiding of a locking pawl within the locking bracket typically is provided by the walls of the locking chamber inside which such a locking pawl is mounted. Such a locking chamber represents an expansion in the radial direction to a drive spindle opening.

In a refinement of one of these torque wrenches for multiple bolts or nuts as described above, it is provided that the torque wrench for multiple bolts or nuts comprises an actuator unit for inducing a rotary movement in the drive spindles, having an actuating wheel mounted rotatably about the axis of the center of the annular drive spindles as drive wheel, which drives respective output wheels fitted on the drive spindles, wherein the driving movement of the actuating wheel is transmitted to the drive spindle via respective torque limiters.

This torque wrench for multiple bolts or nuts has an actuator unit, which is actuated before the actual tightening or loosening process begins. The drive spindles can be moved with this actuator unit. For this purpose, the actuator unit has an actuating wheel, which is mounted rotatably about the axis of the center of the annular drive spindles. This actuating wheel is a drive wheel and drives respective output wheels that are seated on the drive spindles. In this manner, a driving movement of the actuating wheel can be transferred to the drive spindles. A particular property of the actuator unit is that the transfer of the driving movement of the actuator wheel to the drive spindles is performed by means of respective torque limiters. The purpose of these is to ensure that the screw connections to be tightened can be tightened with equal torque by means of the actuator unit on a first pass. The actuating wheel can be operated manually, for example with a ratchet as a drive tool or with an electric screw tool. Of course, it can also be operated hydraulically or pneumatically. The torque introduced into the actuating wheel is limited. Due to the rotational movement of the actuator wheel and the resulting rotational movement of the drive spindles at the torque transmitted via the slip couplings, the torque-applying tools seated on the drive ends of the drive spindles are rotated. The torque-applying tools are typically spring-loaded torque-applying tools, which can be adjusted in the longitudinal axial direction by a certain amount against the force of a return spring on the drive spindle. If, when actuating the actuator device, the torque-applying tool for multiple bolts and nuts is held against the fastening elements, for example, the bolts, the torque-applying tools executed in this embodiment as sockets snap onto the bolt heads when their respective, complementary contours are aligned with each other. Thus, by operating the actuator unit with a low, in particular manually transferred, torque, the torque-applying tools can easily mate to the respective complementary contours of a fastening element and thus engage with them.

BRIEF DESCRIPTION OF THE DRAWINGS

In the following, the present disclosure is described on the basis of an example embodiment with reference to the attached drawings, wherein.

Figure 1:
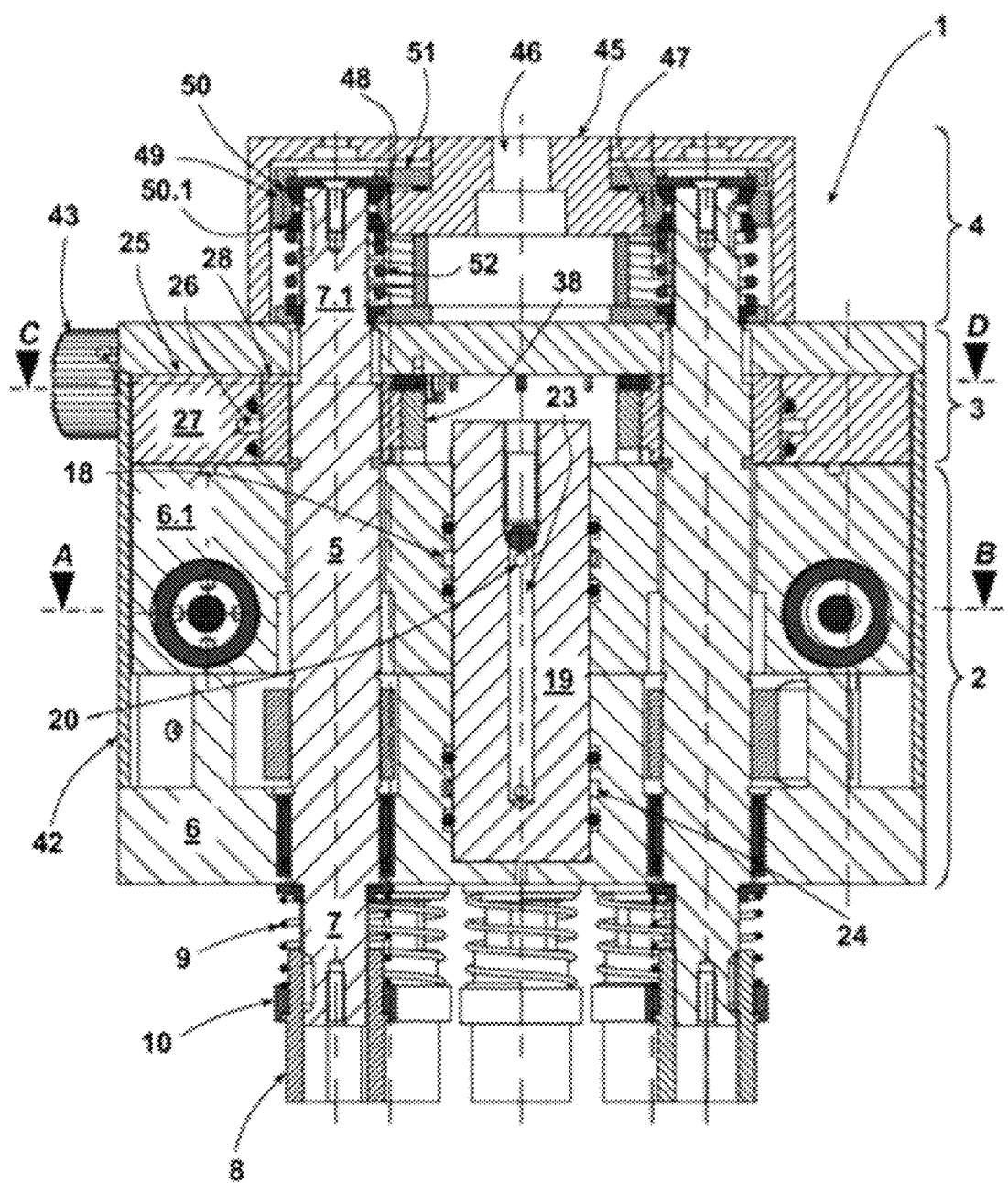
FIG. 1 shows a longitudinal-section view through a torque wrench for multiple bolts or nuts.

In the example embodiment shown in the drawings, a torque wrench for multiple bolts or nuts 1 is of a modular design and comprises a drive block 2 as the first module, a locking unit 3 as the second module, and an actuator unit 4 as the third module. The individual modules 2, 3, 4 are explained below. Even if, within the context of these explanations, these are combined for forming the torque wrench for multiple bolts or nuts 1, the individual modules 2, 3, 4 can also be used independently of each other together with differently designed components of a torque wrench for multiple bolts or nuts. For example, the functionality achieved with the locking unit 3 can also be combined in connection with another drive block or also without actuator unit or with a differently formed actuator unit. The same applies to the actuator unit 3.

The Drive Block

In the example embodiment shown here, eight drive spindles 5 are provided in the drive block 2. These are arranged annularly around a center. These are rotatably supported and held in the drive block 2. The drive block 2 has a cylindrical outer lateral surface. In the sectional representation of FIG. 1, two drive spindles 5 are shown in a sectional view, while three others, positioned behind them, are recognizable in a front view or partial view. The drive spindle 5 shown on the left in FIG. 1 and its drive are described in more detail in the following. These explanations also apply equally to the other drive spindles 5, which are designed in the same way as the drive spindle and its drive described below.

In the example embodiment shown here, the drive block 2 is provided by two block discs 6, 6.1. The drive spindle 5 penetrates the block discs 6, 6.1, which are connected to each other, and protrudes from them on both ends. These sections of the drive spindle 5 protruding from the drive block 2 are referenced as drive sections 7, 7.1 in the context of these explanations. As torque-applying tool, a socket 8 having an inner contour is seated on the drive section 7 in a torque-transferring manner, which drive section 7 in FIG. 1 protrudes from the bottom of the drive block 2. The socket 8 is detachably held on the drive section 7 in a manner known per se, specifically held by a locking ring 10 pretensioned by a compression spring 9. If the locking ring 10 is moved in the direction of the drive block 2, the locking effect caused by a ball not shown in the drawing is released, such that the socket 8 can be detached from the drive section 7. The drive spindle 5 is supported in the drive block 2 by bearings, which can also have seals at their outward-facing sides, which prevent an entry of contamination into the bearings of the drive spindle 5.

Figure 2:
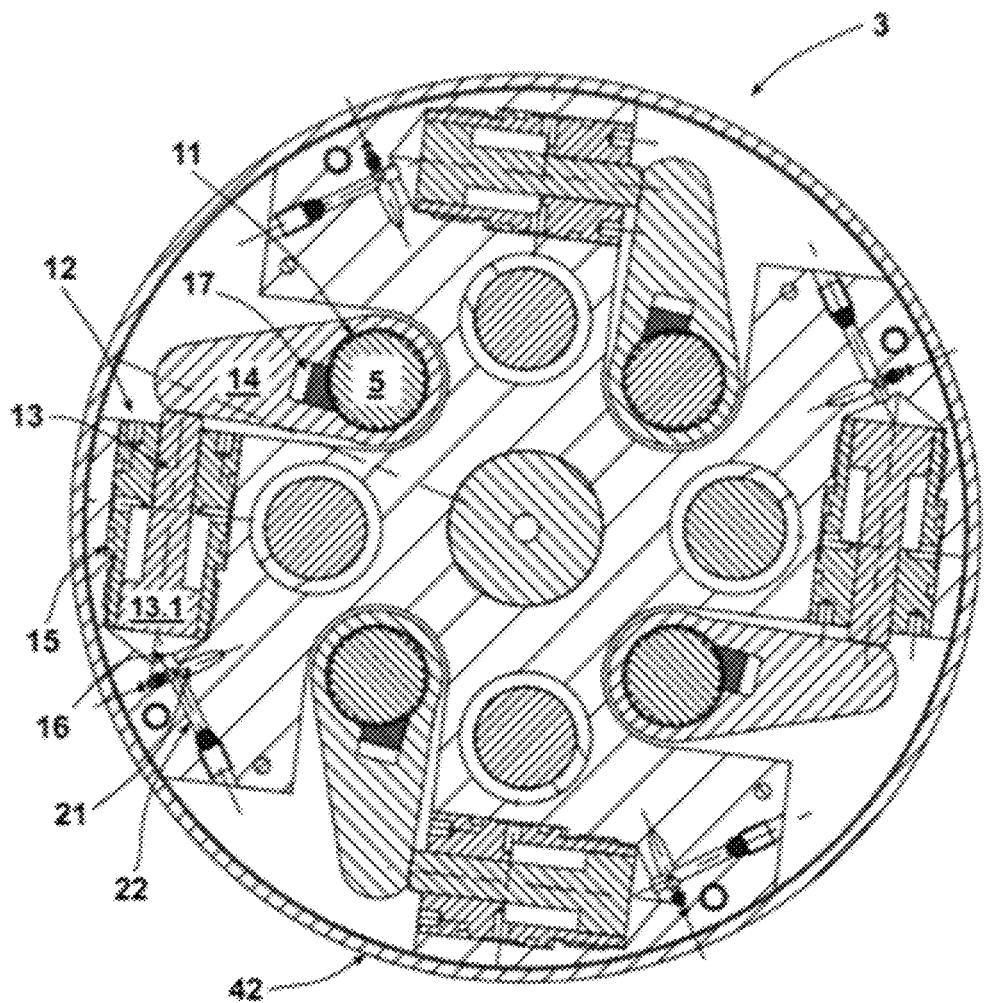
FIG. 2 shows a cross-section along line A-B of the torque wrench for multiple bolts or nuts of FIG. 1.

A ratchet drive serves for driving the drive spindle 5, as is described more clearly by means of the cross-sectional representation of FIG. 2. In the example embodiment shown here, four ratchet drives are housed in the upper block disc 6.1 and four further ratchet drives in the lower block disc 6. The respective ratchet drives for the individual drive spindles 5 are of the same design.

To provide a drive by means of such a ratchet drive, the drive spindle 5 has circumferential, asymmetrical outer splines 11 in its drive section, as is typical for ratchet drives. The longer spline flanks point in the drive direction of the drive spindle 5. The shorter spline flanks point in the opposite rotational direction. The ratchet drive comprises a piston-cylinder arrangement 12, the piston rod 13 of which acts on a ratchet lever 14. A piston 13.1 supporting the piston rod 13 is located in a cylinder housing provided by a screw-in cylinder 15. The cylinder housing 15 has two fluid connectors, of which a fluid connector 16 is visible in the sectional view of FIG. 2. This fluid connector 16 opens into the bottom area of a hole drilled in the drive block 2, which receives the screw-in cylinder 15. Hydraulic fluid is fed into the cylinder housing 15 via the fluid connector 16 for moving the piston 13.1 with its piston rod 13 to perform a forward stroke. The hydraulic connector for the return stroke opens radially into the screw-in cylinder 15 at the side of the piston 13.1 opposite to the fluid connector 16. The piston rod 13 is connected to the ratchet lever 14 in a manner transferring both compressive and tensile forces, such that a forward stroke performed by the piston leads to a forward stroke movement by the ratchet lever 14. By performing a return stroke, the ratchet lever 14 is returned to its position shown in FIG. 2. The piston 13.1 is connected to the ratchet lever 14 via a push rod as an extension of the piston rod 13. This push rod penetrates a hole in the ratchet lever 14, which extends in the direction of movement of the piston rod 13. Between the push rod and the piston rod 13 is an actuating tappet with which the piston rod 13 interacts for transferring a forward stroke movement against a bolt of the ratchet lever 14 providing the aforementioned hole that is penetrated by the push rod. The push rod penetrates the hole. A retaining disc, for example a snap ring, is located on the section of the push rod protruding from the hole, by means of which disc the ratchet lever 14 is moved along when the piston rod 13 performs a return stroke movement.

A pawl 17 is inserted in the ratchet lever 14. The teeth of the pawl 17, which is under spring preload (not shown in the drawing), engage with the outer splines 11 of the drive spindle 5. The teeth of the pawl 17 are designed to be complementary to the outer splines 11 of the drive spindle 5. During a forward stroke of the piston rod 13, which leads to a rotation to the right of the ratchet lever 14, the drive spindle 5 is moved clockwise. In the example embodiment shown here, the drive spindle is advanced by one tooth when a forward stroke is performed. During a return stroke, the ratchet lever 14, along with the pawl 17, is returned in its position shown in FIG. 2, while the drive spindle 5 remains in its position into which it had been moved by the previously performed drive movement.

The drive block 2 shown in FIG. 1 shows the stacked arrangement of the ratchet drives offset at an angle in the two block discs 6, 6.1. The drive block 2 of the torque wrench for multiple bolts or nuts 1 has a first hydraulic fluid connector for feeding hydraulic fluid from a hydraulic pump for performing the forward stroke and a second hydraulic connector for feeding hydraulic fluid for performing the return stroke. These hydraulic connectors are not visible in the drawing. The hydraulic fluid connector for the forward stroke is connected to a fluid distribution cavity designed as an annular duct 18 by means of a duct extending in the radial direction. The annular duct 18 is located in the wall of a central hole located in the drive block 2. The hole is filled with a cylindrical fluid distributor 19. This distributor is crossed by transverse bores 20 at the height of the annular duct 18. On both sides of the annular duct 18, sealing rings are provided in slots for sealing the lateral surface of the fluid distributor 19. The annular duct 18 serves for supplying hydraulic fluid required for the forward stroke of the piston-cylinder arrangements 12 of the ratchet drives arranged in the block disc 6.1. Fluid ducts also open into the annular duct 18, which fluid ducts establish a connection between the annular duct 18 and the piston-cylinder arrangements 12 installed in the block disc 6.1 for the forward stroke. A small section 21 of such a line is visible in FIG. 2, as it is inclined relative to a horizontal plane. The transverse bore 22, which is adjacent to the section 21, is used to establish a fluid connection between the radial extension of the section 21 and the fluid connector 16 or the cylinder housing 15. This transverse bore 22 is closed at its end that is opposite to the screw-in cylinder 15. The aforementioned transverse bores 20 serve to also supply the piston-cylinder arrangement of the block disc 6 with hydraulic fluid for the forward stroke. Said bores open into a central fluid duct 23, through which a fluid path is established to the same plane as a second annular chamber 24 in the lower block disc 6. Four fluid ducts also open into the annular chamber 24 for establishing a fluid connection between a first fluid connector of the cylinder housings received in the block disc 6.

The piston-cylinder arrangements 12 of the drive block 2 are all designed identically. Therefore, the same amount of hydraulic fluid is required for performing a forward stroke of each piston-cylinder arrangement.

The hydraulic fluid connection for feeding hydraulic fluid for the return stroke opens into an annular fluid distributor 25 connected to the top of the block disc 6.1. The fluid distributor 25 provides another annular duct 26, into which fluid ducts (not shown in detail in the drawing) open, which fluid ducts are connected to respective backstroke fluid connectors of a screw-in cylinder 15 at their other end. While the fluid ducts for feeding hydraulic fluid to the piston-cylinder arrangements 12 largely extend in the radial direction, the fluid ducts for feeding the hydraulic fluid for performing a return stroke largely extend in the vertical direction and thus in the direction of the longitudinal extension of the drive spindles 5.

In the example embodiment shown here, the annular duct 26 is provided by two annular bodies 27, 28 arranged concentrically to each other. The geometry of the annular duct 26 is located in the inner wall of the annular body 27 located on the outer side as seen in the radial direction. The inner side of the annular duct 26, as seen in the radial direction, is closed by the outer lateral surface of the second annular body 28. Ring seals arranged adjacent to the annular duct 26 ensure the necessary tightness. The annular body 28 is penetrated by the drive spindles 5, as is visible in FIGS. 1 and 3.

The Locking Unit

In the example embodiment shown here, the inner annular body 28 at the same time represents a locking bracket. The drive spindles 5 penetrate the annular locking bracket 28. The locking bracket 28 bears respective locking ratchets 29 associated with each drive spindle 5 for locking the respective drive spindle 5 against turning back or springing back when the drive ratchet performs a return stroke movement, i.e., when the pawl with its teeth is moved away from the outer splines 11 of the drive spindle 5. Each locking ratchet 29 comprises a locking chamber 30 as an extension of the opening 31, which is penetrated by the drive spindle 5. A locking pawl 32 is located in the locking chamber 30, the teeth of which locking pawl 32 under spring-load (not shown in the drawings) engage with the outer splines 33, which also are present at this section of the drive spindle 5. The outer splines 33 and the outer splines 11 of the drive spindle 5 are asymmetrical with the same orientation and are designed with the same number of teeth. The same applies to the operational direction of the locking pawl 30 and the pawl 17. The locking ratchet 29 has the effect that the locking ratchet 29 remains in its locking position when a return stroke of the drive ratchet is performed. This makes possible an application of torque to the drive spindle 5 and thus to the torque-applying tool, designed as a socket 8 in the example embodiment shown here, and to a bolt to be tightened in such a measure that torsional force is exerted onto the bolt and/or the drive spindle 5. Due to the blocking effect of the locking ratchet 29, an otherwise unavoidable springing back of the torsion introduced into the drive spindle 5 and/or the bolt is effectively prevented when a return stroke is performed.

Figure 3:
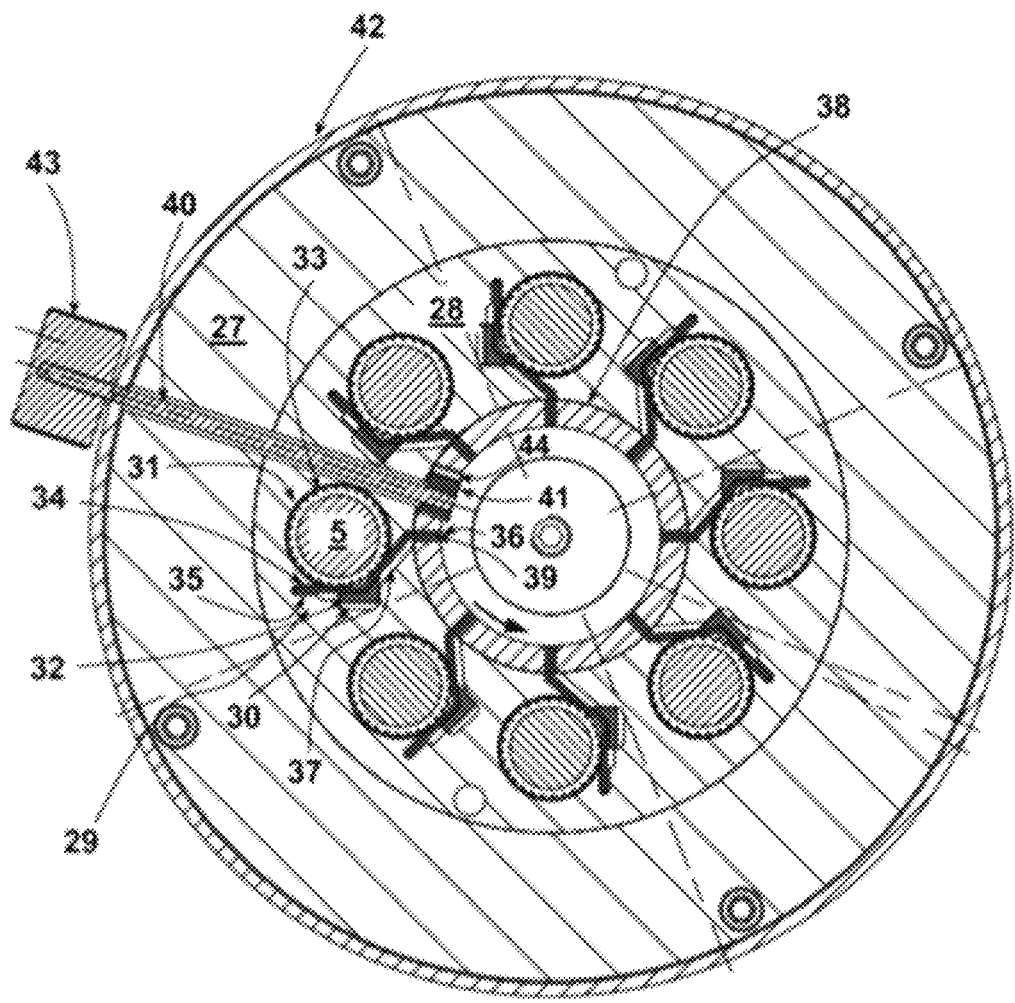
FIG. 3 shows another cross-section along the line C-D through the torque wrench for multiple bolts or nuts of FIG. 1 to represent a locking device for locking the drive spindles in a locking position.
Figure 4:
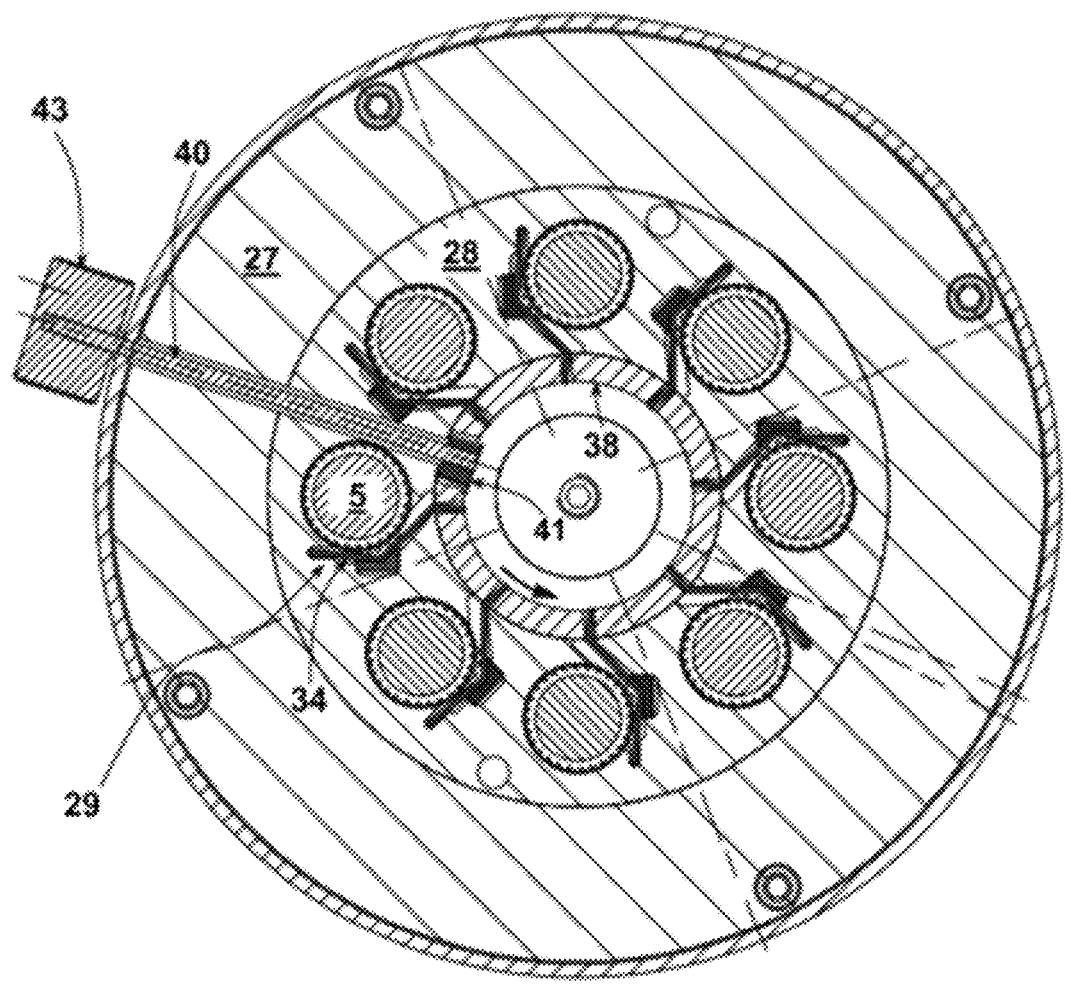
FIG. 4 shows the representation of FIG. 3 with unlocked locking devices.

The locking pawl 32 is designed T-shaped in its cross section, wherein the middle portion bears the locking teeth interacting with the outer splines 33 of the drive spindle 5. The sections adjacent to both sides each have an actuating area with which an actuating lever 34 makes contact. The actuating lever 34 serves the purpose of moving the locking pawl 29 out of the position in which its teeth engage with the outer splines 33 of the drive spindle 5, when it is to be unlocked. The actuating lever 34 is held with its radially outward end in a return lever accommodation 35 of the locking bracket 28. Although the locking lever 34 is designed as an angle, as shown in FIG. 3, it penetrates the locking bracket 28 in an essentially radial direction and with an actuating section 36 protrudes from the locking bracket 28 toward the inside, as seen in the radial direction. The actuating lever 34 is routed in an actuating lever channel 37 of the locking bracket 28. The locking channel 37 has sufficient clearance in the circumferential direction of the locking bracket 28 to allow a movement of the actuating lever 34 to move the locking pawl 29 away from the drive spindle 5, specifically move it far enough away that the engagement of teeth of the locking pawl 29 with the outer splines 33 of the drive spindle 5, which otherwise is effected by the spring load, can be released. Further inward, as seen in the radial direction, from the locking bracket 28 is an actuating ring 38, which in turn has a return lever accommodation 39 for the actuating section 36 of the actuating lever 34. The actuating ring 38 can be rotationally displaced relative to the locking bracket 28, as indicated by an arrow in FIG. 3. An actuating rod 40 serves for displacing the actuating ring 28, which rod bears an actuating cam 41 at its end portion engaging with the actuating ring 38. The actuating rod 40 is routed outward through the locking bracket 28, the outer annular body 27 and through a housing 42, and bears a handle 43 at its end protruding from the outer housing 42, via which handle 43 the actuating rod 40 can be rotated for displacing the actuating ring 38. FIG. 3 shows the locking bracket 28 with its locking ratchets 29 and the actuating ring 38 in the tightening position of the torque wrench for multiple bolts or nuts 1, in which position the locking ratchets 29 engage with the outer splines 33 of the drive spindle 5 in a manner that locks the latter.

To push back the locking pawls 30 from their position in which they engage with the outer splines 31 of the drive spindles 5, the actuating rod 40 is rotated by means of the handle by about 180 degrees. Due to the engagement of the eccentrically designed actuating cam 41 with an actuating cam recess 44 of the actuating ring 38, the actuating ring 38 is adjusted counterclockwise, whereby the actuating levers 34 fitted tightly against the actuating areas move the locking pawls 32 away from the respective drive spindle 5. If a torsional force acts on the locking pawls 32 via the drive spindles 5 and it is not easily possible to release the locking mechanism by turning the actuating rod 40, as previously described, the piston cylinder arrangements 12 are controlled to perform a forward stroke, such that the torsional force acting on the locking pawls 32 is reduced. The torque wrench for multiple bolts or nuts 1 can then easily be removed from the tightened bolts.

The locking unit 3 thus makes it possible to tighten screw connections with a particularly high torque using the torque wrench for multiple bolts or nuts 1, in particular with such a torque at which the screw connection remains tight even when exposed to a certain torsion of the components that were fastened together.

The Actuator Unit

The actuator unit 4 acts on the drive sections 7.1 of the drive spindles 5 opposite to the torque-applying tools (see FIG. 1). The actuator unit 4 serves for inducing a rotational movement in the drive spindles 5, in order to bring the inner contour of the sockets 8 seated on the drive sections 7 into alignment with the outer contour of the individual bolts. In addition, the actuator unit 4 serves the purpose of bringing the bolts to be tightened by means of the torque wrench for multiple bolts or nuts 1 to a uniform preload before the hydraulic tightening process.

The actuator unit 4 comprises a central actuating wheel 45 with a drive contour 46 located centrically within said wheel, into which contour, for example, the square shaft of a ratchet or another manual or electrical tool can be inserted. By turning the actuating wheel 45, the drive spindles 5 can be driven via respective torque limiters. The actuating wheel 45 bears outer splines 47, which mesh with an output wheel 48 that is seated on the drive section 7.1. The output wheel 48 has corresponding, complementary teeth 49 and acts on two coupling rings 50, 50.1 with its radial inner side having two coupling surfaces. The inside of the output wheel 48 is conically tapered for this purpose and acts against complementary inclined coupling surfaces of the coupling rings 50, 51. The upper coupling ring 50 in FIG. 1 acts in the direction of the longitudinal axis of the drive spindle 5 against a counter bearing plate 51. The lower coupling ring 50.1 is under the preload of a compression spring 52 acting on it, which spring is supported on a counter bearing with its other end; through this compression spring 52, the coupling ring 50.1, via the output wheel 48, acts in the direction of the other coupling ring 50. Thus, the force transfer from the output wheel 48 to the coupling rings 50, 50.1 seated on the drive section 7.1 of the drive spindle 5 in a torque-transferring manner is limited by the compression spring 52.

As the actuating wheel 45 drives all drive spindles 5 in the same manner, a low torque suffices to bring the torque-applying tools seated on the opposite drive section 7 of the drive spindles 5 into the position required for engagement with, for example, the head of a bolt. In addition, the bolts are tightened at the same preload by the drive via the actuating wheel 45. If a screw bolt is tightened with a certain preload, the slip coupling installed on the respective drive spindle 7.1 operates as a torque limiter, such that this drive spindle 5 is not turned further by additional rotary movements of the actuating wheel 45, wherein, on the other hand, the other drive spindles, which can still transfer the torque transferred via the torque limiter, are turned further, specifically until their respective torque limiters formed by the coupling discs 50, 50.1 also are triggered. Thus, a uniform torque limitation of the torque transferred via the actuating wheel 45 to the drive spindles 5 is achieved in a simple manner Other Operational Devices The torque wrench for multiple bolts or nuts 1 is associated with a hydraulic unit and a control device for controlling the hydraulic unit for its operation. The hydraulic unit comprises a hydraulic pump, a fluid tank for the storage of hydraulic fluid, typically hydraulic oil, as well as a fluid pressure output for the forward stroke and another fluid pressure output for the return stroke. In addition, the hydraulic unit has a flow measurement device for detecting the hydraulic fluid quantity conveyed, which is used to detect said quantity during the operation of the hydraulic unit. According to a preferred operating method of the torque wrench for multiple bolts or nuts, the hydraulic unit is controlled dependent on fluid flow rates, based on information from its flow measurement device. This ensures that a switch from a forward stroke to a return stroke of the hydraulic actuator cylinders of the torque wrench for multiple bolts or nuts takes place only when the predefined hydraulic fluid quantity has been conveyed. This predefined hydraulic fluid flow quantity corresponds to the hydraulic fluid volume required to move the piston arranged in each hydraulic actuating cylinder from its one end position to its other end position. This ensures that a switch from a forward stroke movement to a return stroke movement takes place only when all pistons of the ratchet drives have actually been moved in equal measures. The same applies to a switch from a return stroke movement to a forward stroke movement. When the hydraulic unit is controlled in this manner, it is therefore irrelevant whether the desired stroke is carried out synchronously in all actuator cylinders or with a small time offset. In order to be able to determine the respective quantity of hydraulic fluid, the torque wrench for multiple bolts or nuts is actuated several times to perform of a stroke before it is used to actually tighten or loosen a bolt. The respective fluid volume conveyed is recorded therein. By repeating this process multiple times, a reliable reference value for the fluid volume conveyed is obtained. This fluid quantity conveyed then determines the switching time. If in such an operation of the hydraulic unit of the torque wrench for multiple bolts or nuts the hydraulic fluid flow quantity required for switching from a forward stroke movement to a return stroke movement could no longer be conveyed, because at least one of the screw connections to be tightened is already sufficiently tightened, causing the actuator cylinder not to be advanced by means of the applied hydraulic pressure, the hydraulic unit typically switches off. A further application of torque can then be carried out by manually controlling the fluid conveyance until all screw connections are tightened with the desired torque. If no more hydraulic fluid is conveyed, all screw connections are tightened with the same torque, as the hydraulic oil pressure remains constant. In this mode of operation, the force with which the screw connections are tightened is dependent on the pressure with which the hydraulic fluid is conveyed. With such a torque wrench for multiple bolts or nuts, screw connections can also be tightened with very high torques.

The operation of the hydraulic unit and thus of the torque wrench for multiple bolts or nuts can also be carried out at different pressure levels. It is possible to perform a first tightening step with only a low hydraulic pressure (a few bar). This step of tightening the bolts merely serves for the torque-applying tools to mate their contour to the complementary fastening elements to be driven, for example the head of a bolt, and that all screw connections are brought into a same initial state with respect to their fastening position. Once this is achieved, the actual tightening of the screw connections takes place. For this purpose, the hydraulic pressure of the hydraulic unit is raised to the pressure corresponding to the torque to be applied. Herein, it is entirely possible to apply pressures from 600 to 800 bar. Of course, it is also possible to provide higher pressures. The tightening process is carried out by means of the fluid control process dependent on fluid quantities conveyed, as already described above.

| List of reference numbers | |
|---|---|
| 1 | Torque wrench |
| 2 | Drive block |
| 3 | Locking unit |
| 4 | Actuator unit |
| 5 | Drive spindle |
| 6, 6.1 | Block disc |
| 7, 7.1 | Drive section |
| 8 | Socket |
| 9 | Compression spring |
| 10 | Locking ring |
| 11 | Outer splines |
| 12 | Piston-cylinder arrangement |
| 13 | Piston rod |
| 13.1 | Piston |
| 14 | Ratchet lever |
| 15 | Cylinder housing |
| 16 | Fluid connector |
| 17 | Pawl |
| 18 | Annular duct |
| 19 | Fluid distributor |
| 20 | Transverse bore |
| 21 | Section |
| 22 | Transverse bore |
| 23 | Fluid duct |
| 24 | Annular chamber |
| 25 | Fluid distributor |
| 26 | Annular duct |
| 27 | Annular body |
| 28 | Annular body/locking bracket |
| 29 | Locking ratchet |
| 30 | Locking chamber |
| 31 | Opening |
| 32 | Locking pawl |
| 33 | Outer splines |
| 34 | Actuating lever |
| 35 | Return lever accommodation |
| 36 | Actuating section |
| 37 | Actuating lever channel |
| 38 | Actuating ring |
| 39 | Return lever accommodation |
| 40 | Actuating rod |
| 41 | Actuating cam |
| 42 | Housing |
| 43 | Handle |
| 44 | Actuating cam recess |
| 45 | Actuating wheel |
| 46 | Drive contour |
| 47 | Outer splines |
| 48 | Output wheel |
| 49 | Teeth |
| 50, 50.1 | Coupling ring |
| 51 | Counter bearing disc |
| 52 | Compression spring |

The invention claimed is:

1. A multiplex bolting tool for multiple bolts or nuts with multiple drive spindles that are arranged around a center and are equipped or able to be equipped at an end with respective torque-applying tools, and a ratchet drive, associated with each drive spindle and driven by means of a hydraulic piston drive, for driving the drive spindles, comprising:

a drive block in which the drive spindles are rotatably supported and held, each drive spindle having a drive section protruding from the drive block on each end, wherein the drive sections of the drive spindles serve to bear the torque-applying tools on one side of the drive block, wherein, in the drive block, pistons of the piston drives are routed in cylinder housings such that said pistons are translationally displaceable in both directions, wherein piston rods of the pistons are each kinematically connected to a ratchet lever for transferring a forward stroke movement and a return stroke movement to the respective ratchet levers with pawls, and wherein the drive block has at least one first fluid distribution cavity in a center area thereof, into which multiple fluid ducts located in the drive block open, said multiple fluid ducts each establish a fluid connection between the at least one first fluid distribution cavity and a first fluid input of one of the cylinder housings, and wherein, on a flat side of the drive block, a fluid distributor with an annular duct connected to a fluid supply duct is arranged as a second fluid distribution cavity, into which multiple fluid ducts open, said multiple fluid ducts each establish a fluid connection between the second fluid distribution cavity and a second fluid input of one of the cylinder housings.

2. The multiplex bolting tool of claim 1, wherein the at least one first fluid distribution cavity located in the center area of the drive block is designed as an annular duct.

3. The multiplex bolting tool of claim 1, wherein the drive block is composed of at least two block discs, wherein multiple ratchet drives are arranged in each block disc.

4. The multiplex bolting tool of claim 3, wherein the at least one first fluid distribution cavity comprises two first fluid distribution cavities, with a first fluid distribution cavity associated with each of the block discs, and fluid connections are established between the two first fluid distribution cavities by another fluid distributor.

5. The multiplex bolting tool of claim 1, wherein the drive spindles bear spring-loaded sockets as the torque-applying tools.

6. The multiplex bolting tool of claim 1, wherein the direction of movement of each piston rod of the ratchet drives is the same as the direction of movement of the respective ratchet lever driven thereby, and the ratchet lever is directly driven by the piston rod.

7. The multiplex bolting tool of claim 1, wherein the direction of movement of each piston rod of the ratchet drives extends at an angle to the direction of movement of the respective ratchet lever driven thereby, and in order to transfer the forward stroke movement and the return stroke movement of the piston rod to the respective ratchet lever, a link is arranged between the piston rod and the ratchet lever such that one end of the link is articulated to the piston rod and the other end of the link is articulated to the ratchet lever.

8. The multiplex bolting tool of claim 7, wherein the link is a lever of a two-bar toggle joint.

9. The multiplex bolting tool of claim 1, wherein the multiplex bolting tool is associated with a hydraulic unit comprising a hydraulic pump, a fluid tank, a fluid pressure output for the forward stroke and a further fluid pressure output for the return stroke, and at least one flow measurement device as well as a control unit for controlling the hydraulic unit, by which control device the hydraulic unit, during operation of the multiplex bolting tool, is switched between a forward stroke conveyance and a return stroke conveyance dependent on a fluid quantity conveyed.

10. The multiplex bolting tool of claim 1, further comprising locking ratchets for locking the drive spindles, each locking ratchet acts on one of the drive spindles, in addition to the ratchet drive, to keep the drive spindle from turning back when the ratchet drive performs a return stroke movement, wherein the locking ratchets are arranged in a locking bracket penetrated by the drive spindles, and the locking bracket has means for loosening the locking ratchets.

11. The multiplex bolting tool of claim 10, wherein each drive spindle opening of the locking bracket comprises a locking chamber in which a locking pawl acting on the drive spindle under spring load is received.

12. The multiplex bolting tool of claim 11, wherein the locking pawl has at least one actuating area facing the drive spindle, against which actuating area a return lever is fitted for moving the locking pawl away from a position in which the locking pawl locks the drive spindle.

13. The multiplex bolting tool of claim 12, wherein the locking pawl has two actuating areas which enclose a middle part supporting teeth of the locking pawl.

14. The multiplex bolting tool of claim 12, wherein each return lever associated with the locking ratchets protrudes with one end into a return lever accommodation of the locking bracket and with its other end protrudes from the locking bracket in the radial direction and engages with a return lever accommodation of an actuating ring which is concentrically rotatable to the locking bracket for displacing the return levers.

15. The multiplex bolting tool of claim 14, wherein the actuating ring is arranged on an inner side of the locking bracket, as seen in the radial direction, and has an actuating cam recess in which an actuating cam is held rotatably relative to the locking bracket for adjusting the actuating ring.

16. The multiplex bolting tool of claim 15, wherein the actuating cam is provided on an actuating rod, which extends in the radial direction and penetrates the locking bracket, with an end of the actuating rod protruding from the locking bracket in the radial direction having a handle.

17. The multiplex bolting tool of claim 14, wherein the return lever has an edge pointing to an actuating area of the locking pawl, starting from which a first bar of the return lever extends to the return lever accommodation of the locking bracket and a second bar of the return lever extends into the return lever accommodation of the actuating ring.

18. The multiplex bolting tool of claim 1, further comprising an actuator unit for inducing a rotary movement in the drive spindles, the actuator unit having an actuating wheel mounted rotatably about the axis of the center of the annular arrangement of the drive spindles as drive wheel, which drives respective output wheels fitted on the drive spindles, wherein driving movement of the actuating wheel is transmitted to the drive spindles via respective torque limiters.

19. The multiplex bolting tool of claim 18, wherein the output wheels are connected to the drive spindles via a slip coupling for transferring drive force to the drive spindles in a torque-limited manner, and respective gear rings of the output wheels mesh with outer splines of the actuating wheel.

20. The multiplex bolting tool of claim 19, wherein the slip coupling of each drive spindle comprises two coupling discs seated on said drive spindle in a torque-transferring manner, each having a coupling surface inclined relative to the longitudinal extension of the drive spindle, which coupling surfaces are inclined to each other for forming an output wheel accommodation, and also comprises the output wheel, which engages with the output wheel accommodation with its inner side designed complementary to the coupling surfaces and which fits against the coupling surfaces of the coupling discs under preload.

21. The multiplex bolting tool of claim 20, wherein the coupling surfaces are curved in the direction of their inclination.

22. The multiplex bolting tool of claim 20, wherein the preload of the slip coupling is provided by a compression spring acting on one of the coupling discs.

23. The multiplex bolting tool of claim 20, wherein the preload of the slip coupling is adjustable.

24. The multiplex bolting tool of claim 18, wherein the actuating wheel has a drive contour for connecting a drive tool.

25. The multiplex bolting tool of claim 18, further comprising a drive block, wherein the actuator unit is designed such that it can be detachably connected to the drive block and components of the actuator unit are received in a housing with an upper part and a lower part.

* * * * *